(12) United States Patent
Rogg

(10) Patent No.: US 6,499,372 B2
(45) Date of Patent: Dec. 31, 2002

(54) TRANSMISSION

(75) Inventor: Andreas Rogg, Lübeck (DE)

(73) Assignee: LuK Lamellen und Kupplungsbau Betelligungs KG, Bühg (DE)

(*) Notice: Subject to any disclaimer, the term of this patent is extended or adjusted under 35 U.S.C. 154(b) by 0 days.

(21) Appl. No.: 09/934,447

(22) Filed: Aug. 21, 2001

(65) Prior Publication Data

US 2002/0058567 A1 May 16, 2002

(30) Foreign Application Priority Data

Aug. 21, 2000 (DE) .......................... 100 40 848

(51) Int. Cl.⁷ ............................................. F16H 59/00
(52) U.S. Cl. ........................................................ 74/335
(58) Field of Search ............................................. 74/335

(56) References Cited

U.S. PATENT DOCUMENTS

| | | | | |
|---|---|---|---|---|
| 4,911,031 A | * | 3/1990 | Yoshimura et al. | ........... 74/335 |
| 6,105,448 A | * | 8/2000 | Borschet et al. | ............. 74/335 |
| 6,205,874 B1 | * | 3/2001 | Kupper et al. | ................ 74/335 |

* cited by examiner

Primary Examiner—Dirk Wright
(74) Attorney, Agent, or Firm—Alfred J. Mangels

(57) ABSTRACT

A method for monitoring the operability of a mechanical power transmission path between an actuator of an automated transmission and a shift element of the transmission. The selection of the gear step to be engaged takes place via a control unit, and before the selection process a matching movement in the selection direction is performed with the shift element until a reference point has been detected by the control unit.

10 Claims, 1 Drawing Sheet

TRANSMISSION

BACKGROUND OF THE INVENTION

1. Field of the Invention

The present invention relates to a method for monitoring the operability of a mechanical power transmission path between an actuator of an automated transmission and a shift element of the transmission.

2. Description of the Related Art

Transmissions for motor vehicles are already known in many forms. A transmission has so far mainly been understood as a manual shift transmission where, in a motor vehicle equipped with such a transmission, the driver selects the shift path and executes the shift process manually through the shift lever. Apart from those manually-actuated transmissions, automated transmissions have meanwhile also become known, where the selection and shift process of the selected gear steps occurs, for example, with control programs that operate actuators that are provided in the transmission. By the position of the shift lever, which, for example, is operated in an H-pattern, the driver of a motor vehicle having such a manual transmission system is provided with information about in which gear the transmission is engaged at that moment. If, for example, a fault occurs in the power transmission path between the shift lever and the internal actuation elements within the transmission, such as the breakage of a gear selector rod, the driver can determine that from the shift lever during the selection or shift process.

When in the case of an automated transmission the selection process of the shift path to the gear step that is to be engaged does not function, due, for example, to a fault in an actuation element of the transmission, that can lead to the previous gear remaining engaged instead of a new target gear step. To survey the selection operation and the shift operation through, for example, two electric motors in an automated transmission, movement path measurements can be obtained from those motors, but they do not enable detection of a fault in the mechanism downstream of the motors.

SUMMARY OF THE INVENTION

The present invention relates to providing a method for monitoring the operability of a mechanical power transmission path between an actuator of an automated transmission and a shift element of the transmission, so that a defect in the power transmission path can be detected before a shift process is carried out.

The invention provides a solution to that task in the independent claims. Advantageous embodiments of the method are described in the additional claims.

In accordance with the invention, a method is provided for monitoring the operability of a mechanical power transmission path between an actuator of an automated transmission and a shift element of the transmission, wherein the selection process of the gear step that is to be engaged is performed by the actuator through a control device, and wherein before a selection process a matching movement in the selection direction is carried out with the shift element until the control unit detects a reference point.

In accordance with the invention the method provides for carrying out a matching movement in the selection direction if, in general, a fault condition is encountered in such a way that a certain probability exists of a defect in the power transmission path. Such a defect can be, for example, a break in the power transmission path, which upon measurement of the movement path of the actuator cannot be detected from the actuator itself, for instance by recording the torsion angle increments of the actuator. If the fault condition is encountered, a matching movement in the direction of a selection movement is carried out by the actuator that is operated with the shift element, until the control unit detects a reference point, so that the probability for the defect can be negated.

Therefore, the invention provides that the reference point is a stop at which the shift element stops in the selection direction, and that the stop is detected by the control unit. The stop can be a stop within the transmission, for example in the neutral path of the transmission. When the shift element meets with the stop, the control unit detects that the stop is encountered, wherein for that purpose, for example, the rotational speed of the actuator can be monitored for the selection process so that a drastic reduction in the rotational speed of the actuator indicates that it has reached the stop. Additionally, an increase in the voltage and/or the current for controlling the actuator can be monitored.

Based on an advantageous embodiment in accordance with the invention, the control unit monitors the sum of the kinetic energy of the actuator and the electric energy fed to the actuator, and compares it with a reference value of elastic energy that can be absorbed by the power transmission path, and carries out the alignment movement after the reference value has been exceeded.

When the actuator in the form of an electric motor is supplied with current, the rotor shaft of the electric motor is accelerated so that it has a certain kinetic energy. After current flow to the electric motor ceases, the motor causes a force to be introduced into the power transmission path, in, for example, a mechanism downstream of the electric motor, with which the force is transmitted to the shift element that is in the form of, for example, a shift finger. When the shift element in the transmission rests against a stop, continued running of the electric motor leads to a winding up or tensioning of the mechanism downstream of the electric motor. A monitoring of the sum of the kinetic energy of the actuator and the electrical energy fed to the actuator enables a determination as to whether that sum exceeds a reference value or threshold value, and that still can be absorbed within the framework of an elastic deformation of the mechanism that is downstream of the electric motor without being damaged.

Once that sum reaches the reference value, the method in accordance with the invention provides for a alignment movement, which leads to the determination of whether the mechanism that is downstream of the electric motor is still functional, which can be recognized by the control unit by the fact that the shift element actuated by the mechanism has reached a stop whose reference position is known, or whether that is not the case.

Since the reference value is not set so high that the mechanism downstream of the electric motor incurs permanent damage, the fact that this reference value has been reached does not lead to such damage. In accordance with the method, there is also provided a proceeding when the above-described sum not only reaches the reference value, but substantially exceeds it. Upon exceeding the reference value beyond a previously established threshold value, the control unit can issue an error message and indicate that to the driver of the motor vehicle with the automated transmission.

Due to the fact that the motor vehicle with the automated transmission is exposed to varying temperature conditions, which can be substantially influenced by, for example, an internal combustion engine that is coupled with the transmission, the invention also provides for a feature based on which the reference value is determined as a function of the temperature in the region of the power transmission path.

An increase in the measured temperature can therefore lead, for example, to a lowering of the reference value, since the mechanism that is downstream of the electric motor is exposed to higher temperature stress, and, thus, the energy that can be absorbed within the framework of elastic deformation without a permanent deformation is reduced.

Since the power transmission path in the form of a mechanism that is downstream of an electric motor must experience less mechanical stress at elevated temperatures, the method in accordance with the invention provides that the electrical energy that is fed to the actuator is limited as a function of the kinetic energy of the actuator and the temperature in the region of the power transmission path.

Finally, the invention also provides that the electrical energy that is fed to the actuator is reduced after detecting a stop, so that the control voltage applied to the actuator, or the load current fed to the actuator, is clearly reduced after the control unit detects the stop.

The control unit can continuously calculate the above-mentioned sum of kinetic energy and electrical energy. The electrical energy can be limited as a function of the kinetic energy and, for example, the temperature can be limited to a maximally permissible value. During a selection process, the highest motor rotational speed value that is associated with the highest kinetic energy of the rotor shaft is taken into consideration, and the electrical energy is limited in relation to it.

Test series can help determine which energy sum can be introduced into the selection mechanism for a permissible elastic deformation of the selection mechanism, which can also occur as a function of the temperature in the region of the selection mechanism. When that energy sum has been reached, there exists a certain probability for a defect in the selection mechanism. With a reference movement or a alignment movement for the purpose of detecting a stop in the selection direction, one can determine whether or not a defect exists. The degree of confidence in the result can be increased through repetition. If the energy sum should clearly exceed the reference value, the possibility of lasting damage is higher, and it can be provided that the control unit gives corresponding error information to the driver of the motor vehicle, in addition to bringing about a reference movement, or as an alternative to a reference movement.

Based on the invention, a method is also provided for monitoring the operability of a mechanical power transmission path between an actuator of an automated transmission and a shift element of the transmission, wherein the selection process for the gear step that is to be engaged is performed with the actuator through a control unit, wherein the threshold force that leads to a permissible elastic deformation of the power transmission path is established, and wherein before or upon reaching the threshold force an overload clutch that is provided in the power transmission path is opened.

An overload clutch can be provided in the power transmission path between the actuator and the automated transmission, which disengages upon reaching a certain load threshold and thereby interrupts the power flow between the actuator and the shift element. Damage to the power transmission path is thereby prevented.

After the overload clutch has been disengaged in order to prevent damage, it can be engaged again, whereupon a alignment movement in the selection direction is performed with the shift element before a selection process, until the control unit detects a reference point. This start to the reference point is used on the one hand to determine that the mechanism downstream of the actuator was not damaged, and on the other hand to also perform a referencing process of the torsion angle increment sensors of the actuator. This also clarifies that the engagement of the overload clutch does not have to occur at a true angle or a true path. Upon engagement of the overload clutch, it acts like a positive-locking connection.

In test series, the energy that the mechanism that is arranged after the actuator requires to actuate the shift element of the transmission within the framework of elastic deformation without lasting damage can be determined. That energy can also be determined as a function of the temperature in the region of the power transmission path. The power peak occurring upon reaching the respective energy is determined, and the overload clutch is designed in such a way that it disengages at a power threshold below the tolerable power poak. When the sum of the kinetic energy of the actuator and the electrical energy fed to the actuator exceeds the disengagement threshold of the overload clutch, the overload clutch disengages and in that way avoids damage to the power train.

Upon engagement of the overload clutch, an appropriate referencing process is performed, such as the one described above. By reaching a stop in the transmission, a positive determination is made that the power transmission string was not damaged, and thereby the torsion angle increment measurement can also be adjusted.

The invented method is provided in particular for utilization as a shift safety device against a shift between the forward motion direction and the reverse motion direction of the automated transmission.

BRIEF DESCRIPTION OF THE DRAWING

The structure, operation, and advantages of the present invention will become further apparent upon consideration of the following description, taken in conjunction with the accompanying drawing in which.

DESCRIPTION OF THE PREFERRED EMBODIMENTS

Figure 1:
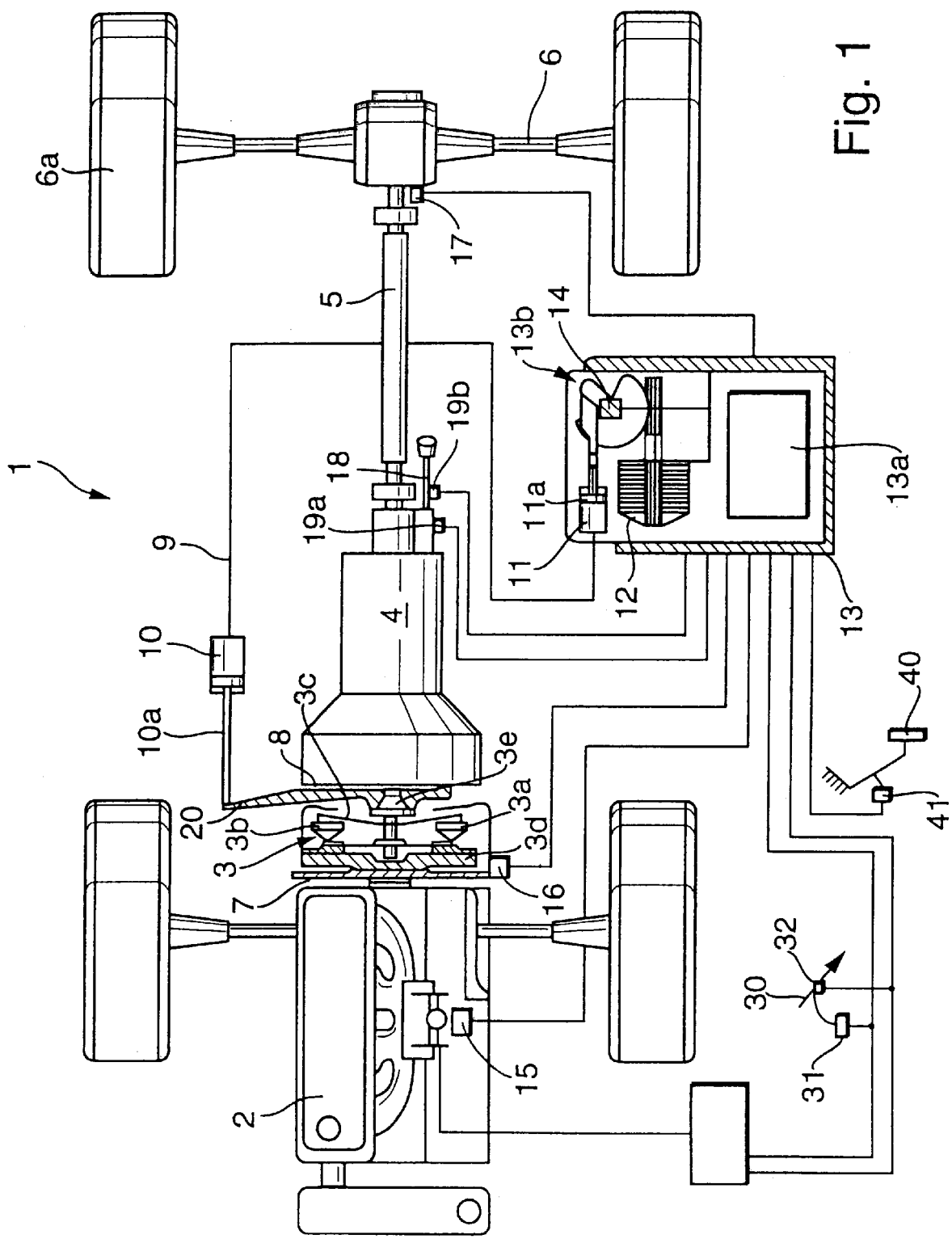
FIG. 1 shows an embodiment of the invention in a diagrammatic and partially sectional view.

FIG. 1 shows schematically a motor vehicle 1 with a drive unit 2, such as a motor or internal combustion engine. Furthermore, a torque transmission system 3 and a transmission 4 are shown in the motor vehicle power train. In this embodiment the torque transmission system 3 is arranged in the power distribution flow between the engine 2 and the transmission 4, wherein a drive torque provided by the engine is transmitted via the torque transmission system 3 to the transmission 4, and from the output side of the transmission to a driven shaft 5 and subsequently to an axle 6, as well as to the wheels 6a.

The torque transmission system 3 includes a clutch, such as a friction clutch, a plate clutch, a magnetic-powder clutch, or a converter lockup clutch, wherein the clutch can be a self- adjusting, wear-compensating clutch. The transmission 4 as shown is a manual transmission, such as a changeable, multi-step transmission. In accordance with the invention, however, the transmission can also be an automated transmission, which can be shifted automatically with at least one actuator. An automated transmission should be understood in the broader sense as an automated transmission that is shifted with tractive power interruption, and where the gear ratio shift process is performed with at least one actuator.

Furthermore, an automatic transmission can also be utilized in which the automatic transmission is a transmission substantially without tractive power interruption during the shift processes, and which generally is constructed of planetary gear steps. The automatic transmission can also be arranged with a torque transmission system 3, such as a clutch or a friction clutch, on the output side.

Furthermore, a continuously variable transmission, such as a belt-driven, conical pulley transmission, can be installed.

The torque transmission system can furthermore be equipped with a starting clutch, and/or a reversing clutch for reversing direction, and/or a safety clutch with a transmittable torque that can be specifically selected. Moreover, the torque transmission system can be a dry friction clutch or a wet friction clutch, which runs in a fluid, for example. Likewise, it can be a torque converter.

The torque transmission system 3 is provided with an input side 7 and an output side 8, wherein torque is transmitted from the input side 7 to the output side 8 by supplying the clutch disk 3a with power through the pressure plate 3b, the disk spring 3c and the release bearing 3e, as well as the flywheel 3d. For that process, the gearshift lever 18 is actuated by a suitable actuating device, such as an actuator.

Control of the torque transmission system 3 takes place through a control unit 13, such as a control device, which can include the control electronics 13a and the actuator 13b. In another advantageous embodiment, the actuator and the control electronics can also be arranged in two different modular units, such as housings.

The control unit 13 can contain the control and power electronics for controlling the electric motor 12 of the actuator 13b. That provides the advantageous result that the system requires only a single structural space for the actuator with the electronics. The actuator 13b includes a drive motor 12, such as an electric motor, wherein the electric motor 12 operates a master cylinder 11 through a suitable transmission mechanism, such as a worm gear drive, a spur gear drive, a crank gear drive, or a threaded spindle gear drive. That connection with the master cylinder can take place directly or by way of a linkage.

Movement of the output part of the actuator 13b, such as the master cylinder piston 11a, is detected with a coupling path sensor 14, which detects the extent of the position or location or speed or acceleration, which is proportional to the position and/or engagement position and/or the speed or acceleration of the coupling. The master cylinder 11 is connected with the slave cylinder 10 through a pressure medium conduit 9, such as a hydraulic conduit. The output element 10a of the slave cylinder is operatively connected with the disengagement lever or disengagement means 20, so that a movement of the output element 10a of the slave cylinder 10 causes the disengagement means 20 to also be moved or tilted in order to control the torque that is to be transmitted by the clutch 3.

The actuator 13b used to control the torque transmitted by the torque transmission system 3 can be actuated by a pressure medium, that is, it can be equipped with pressure-medium master and slave cylinders 11, 10, respectively. The pressure medium can be, for example, a hydraulic fluid or a pneumatic medium. The actuation of the pressure-medium master cylinder 11 can be provided by an electric motor, wherein the electric motor 12 can be controlled electronically. Apart from an electric-motor-driven drive element, the drive element of the actuator 13b can also be different, for example, a pressure-medium-actuated drive element. Furthermore, magnetic actuators can be utilized in order to adjust a position of a drive element.

In the case of a friction clutch, control of the torque to be transmitted is precisely effected by the contact pressure of the friction linings of the clutch disk 3a between the flywheel 3d and the pressure plate 3b. Through the position of the disengagement means 20, such as a disengagement fork or a central disengagement device, the force of the pressure plate 3b, and/or of the friction linings, can be precisely controlled, whereby the pressure plate 3b can be moved between two end positions and can be arbitrarily adjusted and fastened. The one end position corresponds with a completely engaged clutch position, and the other end position corresponds with a completely disengaged clutch position. For the control of a transmitted torque that is, for example, lower than the then-available engine torque, a position of the pressure plate 3b can be controlled, for example, so that it lies in an intermediate region between the two end positions. The clutch can be secured in that position through the precise control of the disengagement means 20. It is also possible, however, to control transmitted clutch torques that are identified to be above the instantaneous engine torque. In such a case, the actual, then-existing engine torque can be transmitted, wherein the torque irregularities in the drive train, in the form, for example, of torque peaks, are damped and/or isolated.

To control, such as to govern or to adjust, the torque transmission system, it is possible to provide sensors that monitor the relevant values of the entire system, at least from time to time, and deliver condition parameters, signals, and measurement values that are necessary for control purposes and that are processed by the control unit, wherein a signal connection can be provided to other electronic units, such as, for example, to engine electronics or to electronics of an anti-lock braking system (ABS) or of an anti-slippage control (ASR). The sensors detect, for example, rotational speeds, such as wheel rotational speeds and engine rotational speeds, the position of the load lever, the throttle valve position, the gear position of the transmission, a shift intention, and further vehicle-specific parameters.

FIG. 1 shows that a throttle valve sensor 15, an engine speed sensor 16, as well as a speedometer 17 are employed to transmit measurement values and information to the control unit 13. The electronic unit 13a, such as a computer unit, of the control unit 13 processes the system-input values and provides control signals to the actuator 13b.

The transmission 4 is configured as a multi-speed drive, wherein the gear ratio steps are changed, or the transmission is actuated or operated, by means of a shift lever 18. Furthermore, at least one sensor 19b, which detects the shift intention and/or the gear position and forwards it to the control device, is arranged on an operating lever of the manual transmission, such as the shift lever 18. The sensor 19a is coupled to the transmission and detects the actual gear position and/or a shift intention. Shift intention detection, utilizing at least one of the two sensors 19a, 19b, can occur by providing the sensor as a force sensor, which detects the operating force applied to the shift lever. Furthermore, the sensor can also be provided as a path sensor or a position sensor, wherein the control unit 13 detects a shift intention from the time-wise change of the position signal.

The control apparatus is in signal-receiving connection with all sensors, at least from time to time, and evaluates the sensor signals and system input values in such a way that the control unit issues control or adjustment commands to the at least one actuator as a function of the actual operating point. The drive element 12 of the actuator, such as an electric motor, receives from the control unit 13 that controls the clutch actuation a manipulated variable as a function of the measurement values and/or the system input variables and/ or signals of connected sensors. In addition, a control program is implemented in the control apparatus, as hardware and/or software, that evaluates the incoming signals and calculates or determines the output parameters based on comparisons and/or functions and/or characteristic fields.

In an advantageous mode, the control unit 13 has a torque determination unit, a gear position determination unit, a slippage determination unit, and/or an operating state determination unit, or it is in signal-receiving connection with at least one of those units. Those units can be implemented through control programs as hardware and/or software, so that the torque of the drive unit 2 of the motor vehicle 1 and the gear position of the transmission 4, as well as the slippage that exists in the area of the torque transmission system 3, and the current operating state of the vehicle can be determined from the incoming sensor signals.

The gear position determination unit determines the currently-engaged gear, based upon the signals from the sensors 19a and 19b. Therefore, the sensors are coupled to the shift lever 18 and/or to adjusting means within the transmission 4, such as, for example, to a central control shaft or to a shift rod, and they detect, for example, the position and/or the speed of those components.

Furthermore, a load lever sensor 31 can be arranged on the load lever 30, such as an accelerator pedal, to detect the position of load lever 30. Another sensor 32 can act as a throttle idle switch, that is, the throttle idle switch 32 is turned on in the case of an actuated accelerator pedal, the load lever, and is turned off by a non-actuation signal, so that whether the load lever, such as the accelerator pedal, is being actuated can be determined by that digital information. The load lever sensor 31 detects the degree of actuation of the load lever.

FIG. 1 shows near the accelerator pedal 30, the load lever, and the sensors connected with it, a brake actuation element 40, for actuating the service brake or the parking brake, such as a brake pedal, a parking brake lever, or a hand- or foot-operated actuation element of the parking brake. At least one sensor 41 is arranged on the brake actuation element 40 and monitors its actuation. The sensor 41 is arranged, for example, as a digital sensor, such as a switch, whereby it detects whether the actuation element is actuated or is not actuated. A signal device, such as a brake light (not shown), can be in signal-receiving connection with sensor 41, to signal that the brake has been actuated. That can apply to the service brake as well as to the parking brake. The sensor 41, however, can also be arranged as an analog sensor, wherein such a sensor, for example, a potentiometer, determines the degree of actuation of the actuation element 40. The analog sensor can also be in signal receiving connection with a signaling device.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicant reserves the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method for monitoring the operability of a mechanical power transmission path between an actuator of an automated transmission and a shift element of the transmission, wherein a selection of a gear step that is to be engaged takes place with the actuator via a control unit, said method comprising the steps of:

performing a matching movement in a gear selection direction until a reference point has been recognized by the control unit before carrying out a gear selection step; and upon recognition of the reference point, performing a gear selection step.

2. A method in accordance with claim 1, wherein the reference point is a stop at which the shift element stops in the selection direction and wherein the stop is detected by the control unit.

3. A method in accordance with claim 1, including the steps of:

monitoring in the control unit the sum of a kinetic energy of the actuator and of electrical energy that is fed to the actuator;

comparing the monitored sum with a reference value of elastic energy that can be absorbed by the power transmission path; and performing the alignment movement when the reference value is exceeded.

4. A method in accordance with claim 3, including the step of issuing an error message when the reference value exceeds a predetermined threshold value.

5. A method in accordance with claim 3, including the step of determining the reference value as a function of a temperature in the region of the power transmission path.

6. A method in accordance with claim 3, including the step of limiting the electrical energy that is fed to the actuator as a function of the kinetic energy of the actuator and a temperature in the region of the power transmission path.

7. A method in accordance with claim 3, including the step of reducing the electrical energy that is fed to the actuator after the stop has been detected.

8. A method for monitoring the operability of a mechanical power transmission path between an actuator of an automated transmission and a shift element of the transmission, wherein a selection process of a gear step that is to be engaged takes place with the actuator via a control unit, said method comprising the steps of:

detecting a threshold force that allows a permissible elastic deformation of the power transmission path; and upon reaching the threshold force, disengaging an overload clutch that is provided in the power transmission path.

9. A method in accordance with claim 8, including the steps of:

re-engaging the overload clutch;

performing a matching movement with the shift element in a selection direction before a selection step until the control unit detects a reference point; and performing a gear selection step.

10. A method in accordance with claim 8, including the step of determining the threshold force as a function of a temperature in the region of the power transmission path.

* * * * *